(12) United States Patent
Christie et al.

(10) Patent No.: US 11,391,206 B2
(45) Date of Patent: Jul. 19, 2022

(54) INTAKE CENTRE FAIRING FOR A GAS TURBINE ENGINE

(71) Applicant: ROLLS-ROYCE plc, London (GB)

(72) Inventors: Robert E Christie, Cranfield (GB); David G MacManus, Olney (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/231,275

(22) Filed: Apr. 15, 2021

(65) Prior Publication Data
US 2021/0355871 A1 Nov. 18, 2021

(30) Foreign Application Priority Data

May 15, 2020 (GB) ..................................... 2007186

(51) Int. Cl.
*F02C 7/04* (2006.01)

(52) U.S. Cl.
CPC .......... *F02C 7/04* (2013.01); *F05D 2220/323* (2013.01); *F05D 2240/12* (2013.01)

(58) Field of Classification Search
CPC .................................. F02C 7/04; B64C 11/14
See application file for complete search history.

(56) References Cited

U.S. PATENT DOCUMENTS

| | | | | |
|---|---|---|---|---|
| 3,228,476 A | * | 1/1966 | Brown | ..................... B64C 11/14 416/94 |
| 3,357,191 A | * | 12/1967 | Berner | ...................... F02K 7/18 60/269 |
| 2019/0211839 A1 | | 7/2019 | Bifulco et al. | |

OTHER PUBLICATIONS

YouTube video "The Mighty J58—The SR-71's Secret Powerhouse" Apr. 12, 2014 [accessed on Mar. 26, 2022 at https://www.youtube.com/watch?v=F3ao5SCedlk] (Year: 2014).*
D'uros, "The Secret Behind Success of the World's Fastest Aircraft: The Engine Nacelles of the SR-71 Blackbird", The Aviationist, Nov. 29, 2019 [accessed on Mar. 26, 2022 at https://theaviationist.com/2019/11/29/engine-nacelles-of-the-sr-71-blackbird/] (Year: 2019).*
Aug. 13, 2020 Search Report issued in British Patent Application No. 2007186.6.

* cited by examiner

*Primary Examiner* — Lorne E Meade
(74) *Attorney, Agent, or Firm* — Oliff PLC

(57) ABSTRACT

An intake centre fairing for a gas turbine engine includes a body. The body includes an outer surface, an apex point and a base. The apex point is at a first end of the body and the base is at a second end of the body. The base includes a base centre. The body defines a longitudinal axis along its length, a radial direction relative to the longitudinal axis and a circumferential direction relative to the longitudinal axis. The outer surface of the body is tapered from the base to the apex point along the longitudinal axis. The apex point is radially offset relative to the base centre along the radial direction. The apex point is further circumferentially offset relative to the base centre along the circumferential direction.

11 Claims, 9 Drawing Sheets

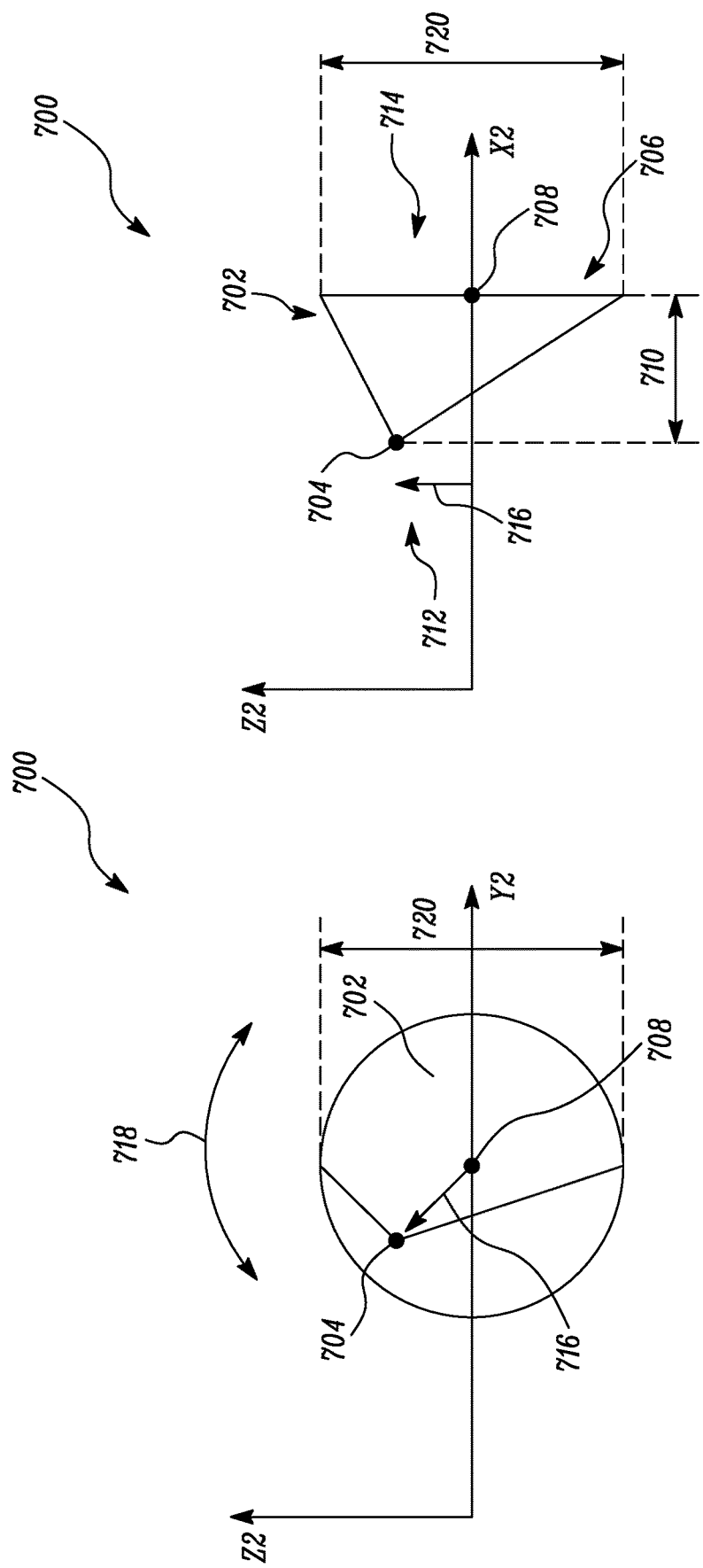

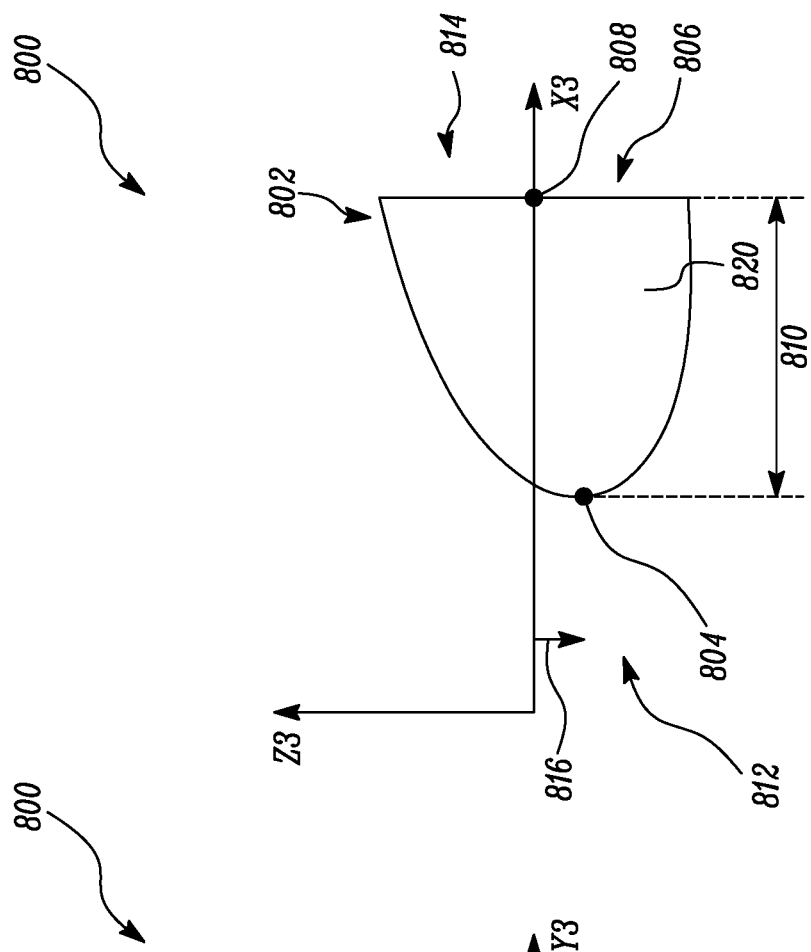
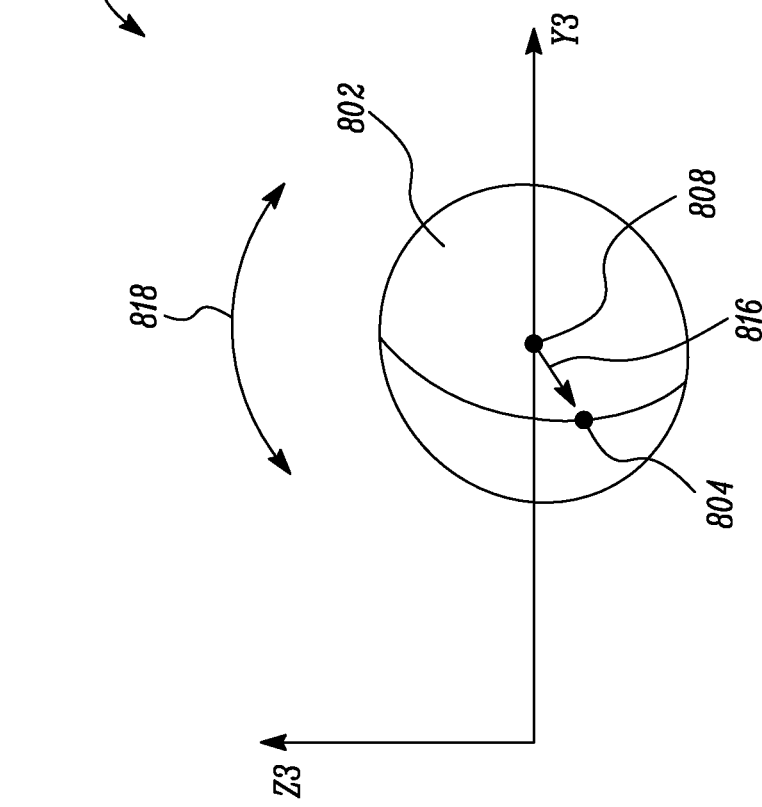
FIG. 8B
FIG. 8A

INTAKE CENTRE FAIRING FOR A GAS TURBINE ENGINE

CROSS-REFERENCE TO RELATED APPLICATIONS

This specification is based upon and claims the benefit of priority from United Kingdom patent application number GB 2007186.6 filed on May 15, 2020, the entire contents of which is incorporated herein by reference.

BACKGROUND

Technical Field of the Disclosure

The present disclosure relates to an intake centre fairing, and in particular to an intake centre fairing for a gas turbine engine for powering aircraft.

Description of the Related Art

An embedded gas turbine engine generally has a closed coupling between an engine fan and an upstream intake duct. This configuration can either work without an inlet guide vane (IGV) or with an IGV. The gas turbine engine typically also has an intake centre fairing that rotates with the fan and is called a spinner. Conventionally, the spinner is axisymmetric. In case of embedded gas turbine engines, the intake centre fairing in the form of a spinner and the outer geometry of the duct controls an area distribution of air flow from the duct to a fan face.

For large podded engines, length of air intakes is reduced which results in short intake design relative to the conventional intake designs. In case of the large podded engines, intake aero lines control a bulk area distribution from a highlight to the fan face of the intake. The gas turbine engines with short intakes may face difficulty to achieve the required performance by the intake aero lines and the associated area distributions.

Conventional intake centre fairings in the form of axisymmetric rotating spinners used in such embedded engines and engines with short intake designs may fail to provide an optimal area distribution of air flow. There is a need for intake centre fairings that address the limitations of such spinners or at least provide a useful alternative to such spinners.

SUMMARY OF THE DISCLOSURE

According to a first aspect, there is provided an intake centre fairing for a gas turbine engine. The intake centre fairing includes a body. The body includes an outer surface, an apex point and a base. The apex point is at a first end of the body and the base is at a second end of the body. The base includes a base centre. The body defines a longitudinal axis along its length, a radial direction relative to the longitudinal axis and a circumferential direction relative to the longitudinal axis. The outer surface of the body is tapered from the base to the apex point along the longitudinal axis. The apex point is radially offset relative to the base centre along the radial direction. The apex point is further circumferentially offset relative to the base centre along the circumferential direction.

The intake centre fairing of the present disclosure may provide an additional degree of freedom in a geometry of an air intake ahead of the fan. The intake centre fairing may further provide control to bulk area distributions of air flow and influence flow non-uniformities. The intake centre fairing with the non-axisymmetric design of the present disclosure may be used in gas turbine engines having short air intakes in order to provide optimal area distribution of intake air flow. The intake centre fairing may be further used in a large geared Ultra-High Bypass Ratio (UHBPR) engine. In case of UHBPR engine, the heat generated in the gear box need to be vented. Vented heat may be used to provide anti-icing to the intake centre fairing.

In some embodiments, the base has a circular shape and the base centre is a centre of the circular shape.

In some embodiments, a radial offset between the apex point and the base centre is less than a radius of the base.

In some embodiments, the base defines a base area normal to the longitudinal axis, and the base centre is a centroid of the base area.

In some embodiments, the longitudinal axis passes through the base centre.

In some embodiments, the body further defines a transverse axis normal to the longitudinal axis. The apex point is offset from the base centre relative to the transverse axis.

In some embodiments, the body further defines a horizontal axis normal to each of the longitudinal axis and the transverse axis. The apex point is offset from the base centre relative to the horizontal axis.

In some embodiments, a radial line joining the apex point and the base centre along the radial direction forms a spin angle relative to the horizontal axis. The spin angle is from 0 degree to 90 degrees.

In some embodiments, the body is at least partially oblique cone shaped.

In some embodiments, the body is rounded around the apex point.

In a second aspect, there is provided a nacelle for a gas turbine engine. The nacelle includes an annular wall and at least one guide vane fixedly coupled to the annular wall. The annular wall defines an intake duct. The nacelle further includes the intake centre fairing of the first aspect. The intake centre fairing is fixedly coupled to the at least one guide vane such that the intake centre fairing is stationary relative to the annular wall.

The intake centre fairing may be used in the gas turbine engine to provide improved control of the area distribution of air flow in the intake duct.

In a third aspect, there is provided a gas turbine engine for an aircraft. The gas turbine engine includes the nacelle of the second aspect. A fan is received within the nacelle and is disposed downstream of the intake centre fairing.

In some embodiments, the gas turbine engine of the third aspect further includes an engine core received within the nacelle.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

According to an aspect, there is provided an aircraft comprising a gas turbine engine as described and/or claimed herein. The aircraft according to this aspect is the aircraft for which the gas turbine engine has been designed to be attached.

According to an aspect, there is provided a method of operating a gas turbine engine as described and/or claimed herein.

According to an aspect, there is provided a method of operating an aircraft comprising a gas turbine engine as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIGS. 7A-7B are front and side views, respectively, of another intake centre fairing in accordance with an embodiment of the present disclosure;

FIGS. 8A-8B are front and side views, respectively, of another intake centre fairing in accordance with an embodiment of the present disclosure.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
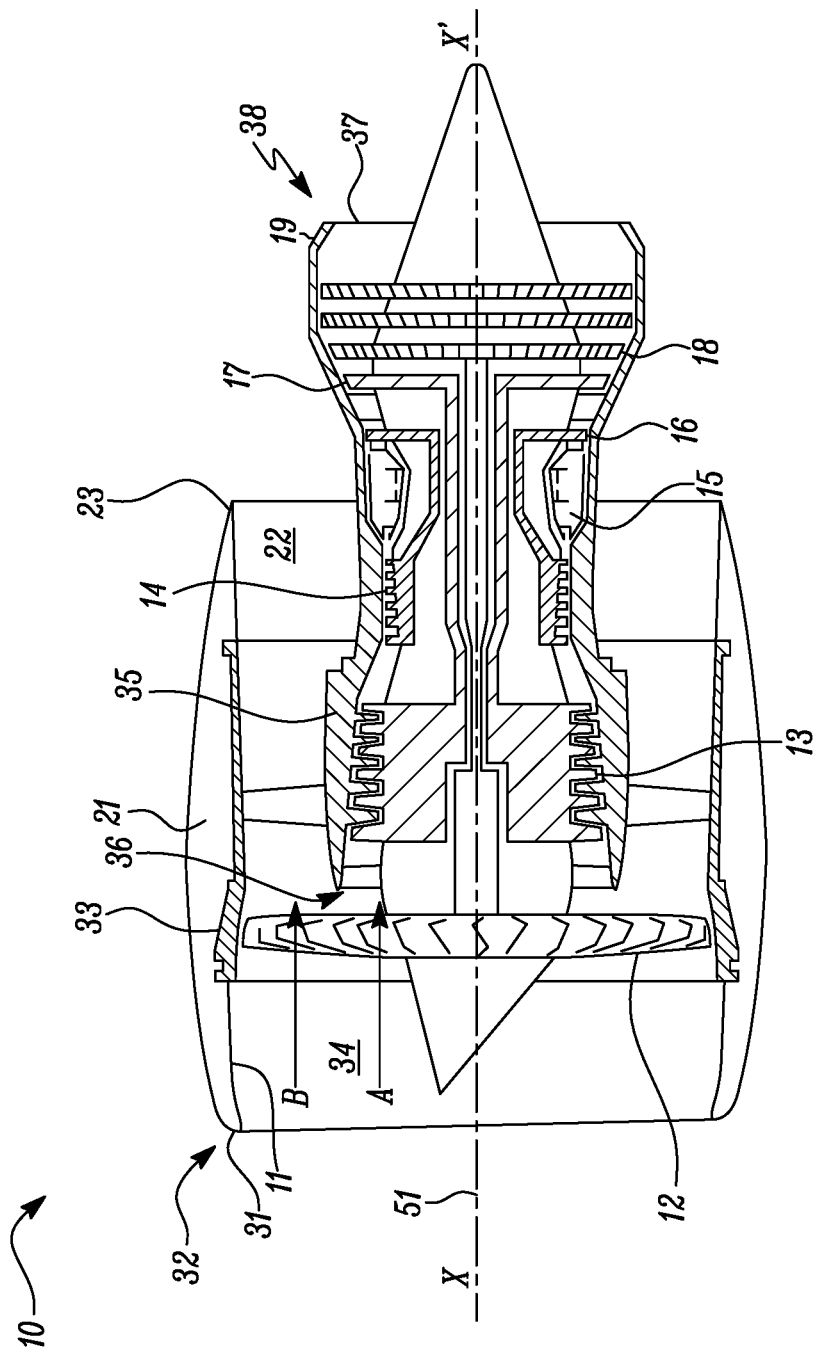
FIG. 1 is a sectional side view of a gas turbine engine.

FIG. 1 shows a ducted gas turbine engine 10 having a principal rotational axis X-X'. The principal rotational axis X-X' coincides with a longitudinal centre line 51 of the gas turbine engine 10.

In the following disclosure, the following definitions are adopted. The terms "upstream" and "downstream" are considered to be relative to an air flow through gas turbine engines. The terms "axial" and "axially" are considered to relate to the direction of a principal rotational axis of the gas turbine engines.

In the following disclosure, the term longitudinal axis is defined as an axis along the direction of the principal rotational axis of the gas turbine engines. The term horizontal axis is defined as an axis normal to the longitudinal axis. The term transverse axis is defined as an axis normal to the both longitudinal and horizontal axis.

In the following disclosure, non-axisymmetric objects are defined as objects which are not symmetric with respect to the longitudinal axis and/or the principal rotational axis of the gas turbine engines.

The gas turbine engine 10 includes, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the core exhaust nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

In some embodiments, the gas turbine engine 10 is used in an aircraft. In some embodiments, the gas turbine engine 10 is an ultra-high bypass ratio engine (UHBPR).

The nacelle 21 further includes an intake lip 31 disposed at an upstream end 32 of the nacelle 21, a fan casing 33 downstream of the intake lip 31, a diffuser 34 disposed between the upstream end 32 and the fan casing 33, and an engine casing 35 downstream of the intake lip 31. The fan 12 is received within the fan casing 33. An engine core 36 of the gas turbine engine 10 including the intermediate pressure compressor 13, the high-pressure compressor 14, the combustion equipment 15, the high-pressure turbine 16, the intermediate pressure turbine 17, the low-pressure turbine 18 and the core exhaust nozzle 19 is received within the nacelle 21. Specifically, the engine core 36 is received within the engine casing 35. The nacelle 21 further includes an exhaust 37 disposed at a downstream end 38 of the nacelle 21. The exhaust 37 may be part of the part of the engine casing 35. The exhaust 37 may at least partly define the core exhaust nozzle 19.

The nacelle 21 for the gas turbine engine 10 may be typically designed by manipulating a plurality of design variables. The selection of the design variables may be dependent on a cruise Mach speed of an aircraft the nacelle 21 is attached to, as well as considerations for integration of engine ancillaries, such as a thrust reversal unit (TRU). Optimisation of these variables may be required to minimise the cruise drag incurred due to size and design of the nacelle 21.

Figure 2:
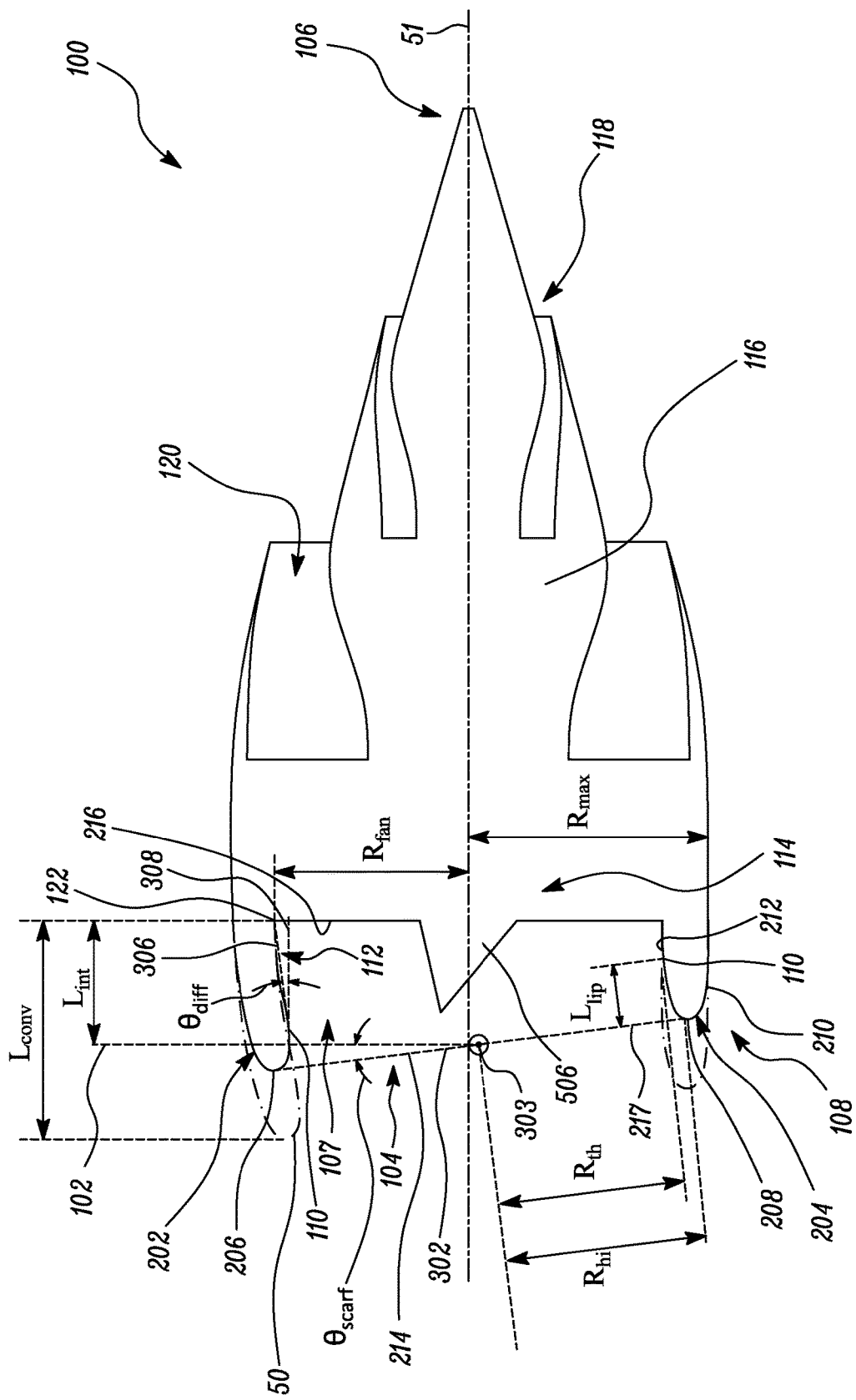
FIG. 2 is a schematic sectional side view of a nacelle of the gas turbine engine.

FIG. 2 illustrates a nacelle 100 for the gas turbine engine 10 (shown in FIG. 1) having the longitudinal centre line 51 in accordance with an embodiment of the present disclosure. The nacelle 100 may be formed using any suitable material. for example, the nacelle 100 may formed as a metal forging, with the metal being selected from the group comprising steel, titanium, aluminium and alloys thereof. Optionally, the nacelle 100 may be formed from a fibre reinforced composite material, with the composite fibre being selected from the group comprising glass, carbon, boron, aramid and combinations thereof. An advantage of using a fibre reinforced composite material to form the nacelle 100 is that its weight may be reduced over a nacelle formed from a metallic material.

As shown in FIG. 1, the longitudinal centre line 51 coincides with the principal rotational axis X-X' of the gas turbine engine 10. The nacelle 100 further includes a reference line 102 perpendicular to the longitudinal centre line 51. The longitudinal centre line 51 is also illustrated in FIG. 2.

Referring to FIG. 2, the nacelle 100 generally has a tubular structure including an upstream end 104 and a downstream end 106 opposite to the upstream end 104. The nacelle 100 according to the present disclosure is illustrated using solid lines. A portion of a conventional nacelle 50 is illustrated by dashed lines.

The nacelle 100 may have a short nacelle design as compared to the conventional nacelle 50. The conventional nacelle 50 is provided for the purpose of illustration and for comparison with the nacelle 100 of the present disclosure.

The nacelle 100 includes an air intake 107 disposed at the upstream end 104 of the nacelle 100. As shown in FIG. 2, the air intake 107 of the nacelle 100 has an intake length $L_{int}$ that is less than a long intake length $L_{conv}$ of an air intake of the conventional nacelle 50. In other words, the air intake 107 conforming to the short nacelle design may be shorter in length as compared to the air intake of the conventional nacelle 50.

The air intake 107 of the nacelle 100 includes, in flow series, an intake lip 108, a throat 110 and a diffuser 112. The intake lip 108 is disposed at the upstream end 104 of the nacelle 100. The throat 110 is positioned adjacent to the intake lip 108 in the direction of air flow along the longitudinal centre line 51. The throat 110 may be disposed at an interface between the intake lip 108 and the diffuser 112. The nacelle 100 further includes an annular wall 500 (shown in FIG. 3). The annular wall 500 defines an intake duct 502 (shown in FIG. 3) for the air intake 107. The nacelle 100 further includes at least one inlet guide vane 504 (shown in FIG. 3) fixedly coupled to the annular wall 500. The nacelle 100 further includes a fan section 114 which accommodates a fan 12 (shown in FIG. 1). The fan section 114 is disposed downstream of and adjacent to the diffuser 112. The diffuser 112 is disposed between the upstream end 104 and the fan section 114. The diffuser 112 further defines a downstream end 122 of the diffuser 112 at the interface with the fan section 114. The nacelle 100 further includes an intake centre fairing 506 disposed upstream of the fan section 114. The intake centre fairing 506 is a non-rotating intake centre fairing with a non-axisymmetric geometry. The intake centre fairing 506 is fixedly coupled to the at least one inlet guide vane 504 such that the intake centre fairing 506 is stationary relative to the annular wall 500.

The nacelle 100 further includes an engine casing 116 disposed downstream of the fan section 114. The engine core 36 (shown in FIG. 1) is received within the engine casing 116. The engine casing 116 surrounds the engine core 36 (shown in FIG. 1). The nacelle 100 further incudes an exhaust 118 disposed at the downstream end 106 of the nacelle 100. In some embodiments, the nacelle 100 may be used in the gas turbine engine 10 (shown in FIG. 1) in an aircraft.

The nacelle 100 is generally terminated by the exhaust 118 whose outlet is located downstream of the engine casing 116. The exhaust 118 may exhaust the resultant hot combustion products from the combustion equipment 15 of the gas turbine engine 10 (shown in FIG. 1). The nacelle 100 may include a cowling disposed proximal to the downstream end 106. The cowling may be able to accommodate ancillaries, such as a TRU. The TRU may be any type, for example, target type, clam-shell type or cold stream type. The nacelle 100 further includes a bypass nozzle 120 disposed proximal to the downstream end 106. The bypass nozzle 120 may exhaust the bypass air.

The intake lip 108, the throat 110 and the diffuser 112 forms the air intake 107 to supply air to the fan 12 (shown in FIG. 1) of the gas turbine engine 10 during operation of the gas turbine engine 10. The air intake 107 may be further required to absorb noise generated by the gas turbine engine 10. The diffuser 112 may be sized and configured for reducing velocity of the airflow while increasing its static pressure.

The intake lip 108 includes a crown 202 and a keel 204. The intake lip 108 includes a top portion and a bottom portion defining the crown 202 and the keel 204, respectively. The crown 202 includes a crown leading edge 206 at an extreme upstream edge of the crown 202. Similarly, the keel 204 includes a keel leading edge 208 at an extreme upstream end of the keel 204. The crown 202 and the keel 204 are spaced circumferentially apart by about 180 degrees relative to the longitudinal centre line 51. In the illustrated embodiment of FIG. 2, the crown leading edge 206 is axially forward of the keel leading edge 208 relative to the longitudinal centre line 51. However, in alternative embodiments, the keel leading edge 208 may be axially forward of the crown leading edge 206 relative to the longitudinal centre line 51.

The intake lip 108 further includes an outer surface 210, an inner surface 212 and a highlight 214 (shown by a dashed line) forming an annular boundary between the outer surface 210 and the inner surface 212. The outer surface 210 may also correspond to an outer surface of the nacelle 100. The inner surface 212 may also correspond to an inner surface of the nacelle 100. The throat 110 and the diffuser 112 are defined by the inner surface 212 of the nacelle 100.

The highlight 214 may define a leading edge 217 of the nacelle 100. The leading edge 217 may be a continuous edge of the nacelle 100 disposed at the upstream end 104. The leading edge 217 may be an annular leading edge having a circumferential extent of 360 degrees around the longitudinal centre line 51. Therefore, the highlight 214 may also be annular as the highlight 214 corresponds to the leading edge 217 of the nacelle 100. The highlight 214 includes the crown leading edge 206 and the keel leading edge 208. The highlight 214 may define a highlight radius $R_{hi}$ of the nacelle 100. The inner surface 212 and the outer surface 210 may define a radius of curvature of the intake lip 108. In some embodiments, the nacelle 100 may include one or more acoustic liners (not shown) provided on the inner surface 212 of the intake lip 108. The intake lip 108 further includes a lip length $L_{lip}$ between the leading edge 217 of the nacelle 100 and the throat 110. In other words, the lip length $L_{lip}$ is defined between the highlight 214 and the throat 110.

The throat 110 extends radially by a throat radius $R_{th}$ with respect to the longitudinal centre line 51. The fan section 114 extends radially by a fan radius $R_{fan}$ with respect to the longitudinal centre line 51.

The air intake 107 extends axially by the intake length $L_{int}$ with respect to the longitudinal centre line 51. The fan section 114 is disposed downstream of the intake lip 108. The fan section 114 includes a fan section leading edge 216. The fan section leading edge 216 may be an upstream edge of the fan section 114 facing the intake lip 108. The fan section leading edge 216 may extend radially from a fan hub 115 (shown in FIG. 3) towards the inner surface 212 of the nacelle 100. The fan section leading edge 216 and the downstream end 122 of the diffuser 112 may be at generally the same axial location relative to the longitudinal centre line 51. The downstream end 122 may be formed at a point of intersection between the fan section leading edge 216 and the diffuser 112. The intake length $L_{int}$ is defined between the leading edge 217 of the nacelle 100 and the downstream end 122 of the diffuser 112. In other words, the intake length $L_{int}$ is defined between the highlight 214 and the downstream end 122 of the diffuser 112. The intake length $L_{int}$ may be defined along the longitudinal centre line 51.

The crown leading edge 206 and the keel leading edge 208 define a scarf line 302 therebetween. Specifically, the scarf line 302 is a straight line that joins the crown leading edge 206 and the keel leading edge 208. The scarf line 302 forms a scarf angle $\theta_{scarf}$ relative to the reference line 102 perpendicular to the longitudinal centre line 51. The scarf angle $\theta_{scarf}$ is indicative of an axial offset between the crown leading edge 206 and the keel leading edge 208 relative to the longitudinal centre line 51. A positive value of the scarf angle $\theta_{scarf}$ may correspond to the crown leading edge 206 being axially forward the keel leading edge 208. On the other hand, a negative value of the scarf angle $\theta_{scarf}$ may correspond to the keel leading edge 208 being axially forward of the crown leading edge 206.

A line connecting the throat 110 and the downstream end 122 of the diffuser 112 is defined as a diffuser line 306. A line 308 generally parallel to the longitudinal centre line 51 passes through the throat 110. The diffuser line 306 intersects the line 308 at the throat 110. A diffuser angle $\theta_{diff}$ of the diffuser 112 is formed between the diffuser line 306 and the line 308. Specifically, the diffuser angle $\theta_{diff}$ is defined as an angle between the diffuser line 306 and the longitudinal centre line 51. Therefore, the diffuser angle $\theta_{diff}$ may be indicative of an inclination of the diffuser 112 with respect to the longitudinal centre line 51. In other words, the diffuser angle $\theta_{diff}$ is indicative of a degree of divergence of the diffuser 112 relative to the longitudinal centre line 51.

Some advantages of scarfing may include noise reduction, improved foreign object damage resistance, and improved keel high incidence angle of attack performance.

The scarf line 302 further defines a midpoint 303 between the crown leading edge 206 and the keel leading edge 208. The highlight radius $R_{hi}$ may be defined as the radius of the highlight 214 measured along the scarf line 302. In some embodiments, the highlight radius $R_{hi}$ is defined as a distance between midpoint 303 of the scarf line 302 and one of the crown 202 and the keel 204 measured along the scarf line 302. Specifically, the highlight radius $R_{hi}$ is measured along the scarf line 302 between the midpoint 303 and the crown leading edge 206 or the keel leading edge 208.

The throat radius $R_{th}$ may be defined as the radius of the throat 110 measured along the scarf line 302. In some embodiments, the throat radius $R_{th}$ is defined as the distance between the throat 110 and the midpoint 303 measured along the scarf line 302. The throat radius $R_{th}$ is less than the highlight radius $R_{hi}$. The nacelle 100 extends radially by a maximum radius $R_{max}$. The maximum radius $R_{max}$ is defined by the outer surface 210 of the nacelle 100 at the fan section 114.

In some embodiments, the intake length $L_{int}$ of the air intake 107 is defined as an axial distance between the midpoint 303 of the scarf line 302 and the downstream end 122 of the diffuser 112. Specifically, the intake length $L_{int}$ is measured along the longitudinal centre line 51 between the midpoint 303 of the scarf line 302 and the downstream end 122 of the diffuser 112. As shown in FIG. 2, the intake length $L_{int}$ of the air intake 107 of the nacelle 100 is less than the long intake length $L_{conv}$ of the conventional nacelle 50.

The nacelle 100 may also be optionally drooped. In such cases, a droop angle (not shown) may be defined between a normal to the fan section leading edge 216 and the longitudinal centre line 51. Some advantages of drooping may include improved low speed high incidence angle of attack performance.

Figure 3:
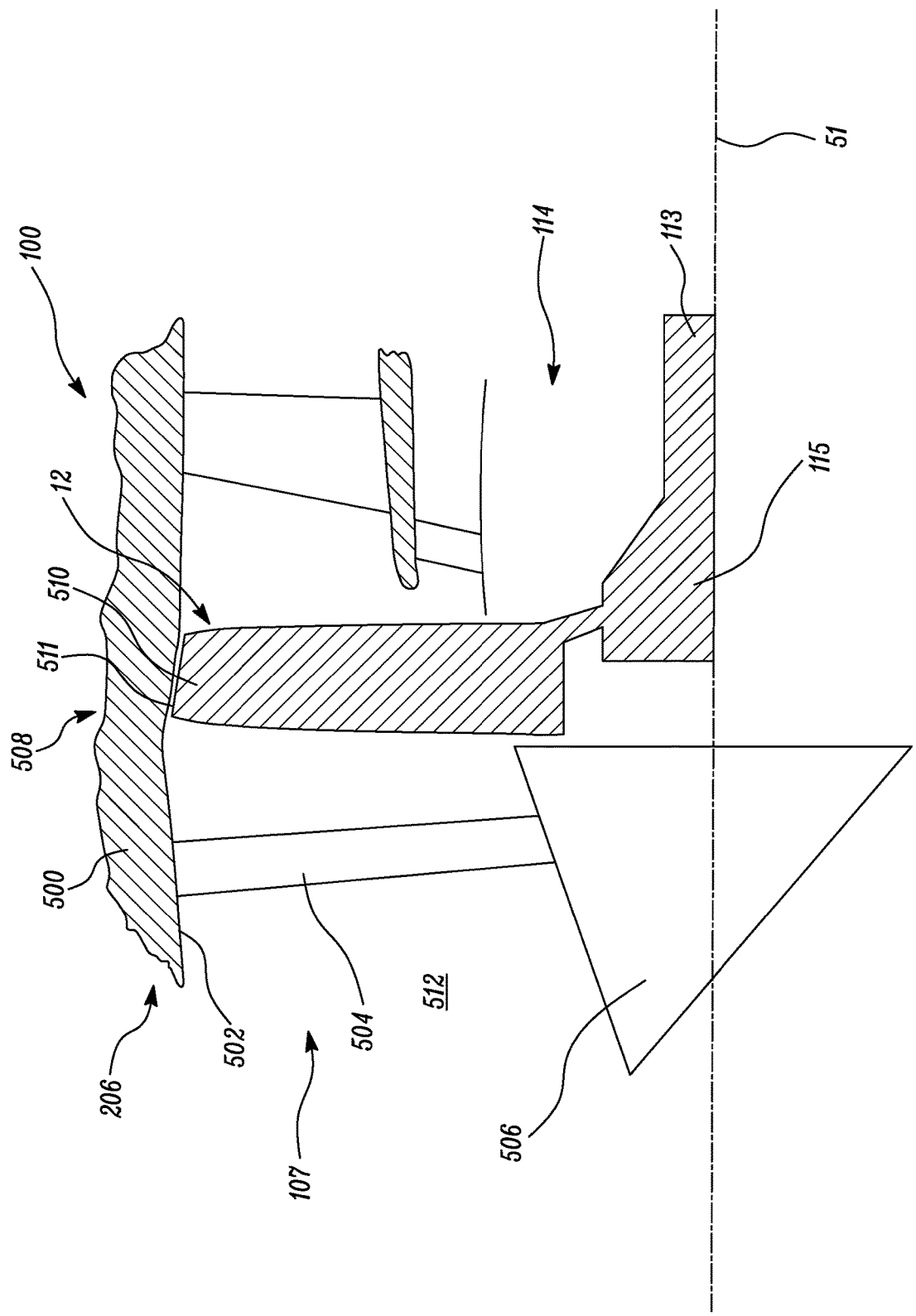
FIG. 3 is a sectional side view of a portion of the nacelle of FIG. 2.

FIG. 3 illustrates enlarged view of a portion of the nacelle 100. A portion of a top half of the nacelle 100 is shown.

Referring to FIGS. 1, 2 and 3, the nacelle 100 further includes the annular wall 500. The annular wall 500 defines the intake duct 502. The nacelle 100 further includes the at least one inlet guide vane 504 and the intake centre fairing 506. The inlet guide vane 504 is fixedly coupled to the annular wall 500. The intake centre fairing 506 is fixedly coupled to the inlet guide vane 504 such that the intake centre fairing 506 is stationary relative to the annular wall 500.

Further, the fan section 114 is received within the nacelle 100. The fan section 114 further includes a shaft 113 and the fan hub 115. The shaft 113 is fixedly coupled with the fan hub 115. The fan section 114 further includes the fan 12. The fan 12 includes fan blades 510 that extend radially outwardly from the fan hub 115 to respective blade tips 511. The nacelle 100 further includes a fan casing 508. The fan casing 508 terminates more upstream of the fan 12 as shown in FIG. 3. This is done to ensure that an enclosed region 512 is defined upstream of the fan 12 in which air entering the air intake 107 is diffused prior to being acted upon by the fan 12. The fan 12 is received within the fan casing 508 and disposed downstream of the intake centre fairing 506.

Figure 4:
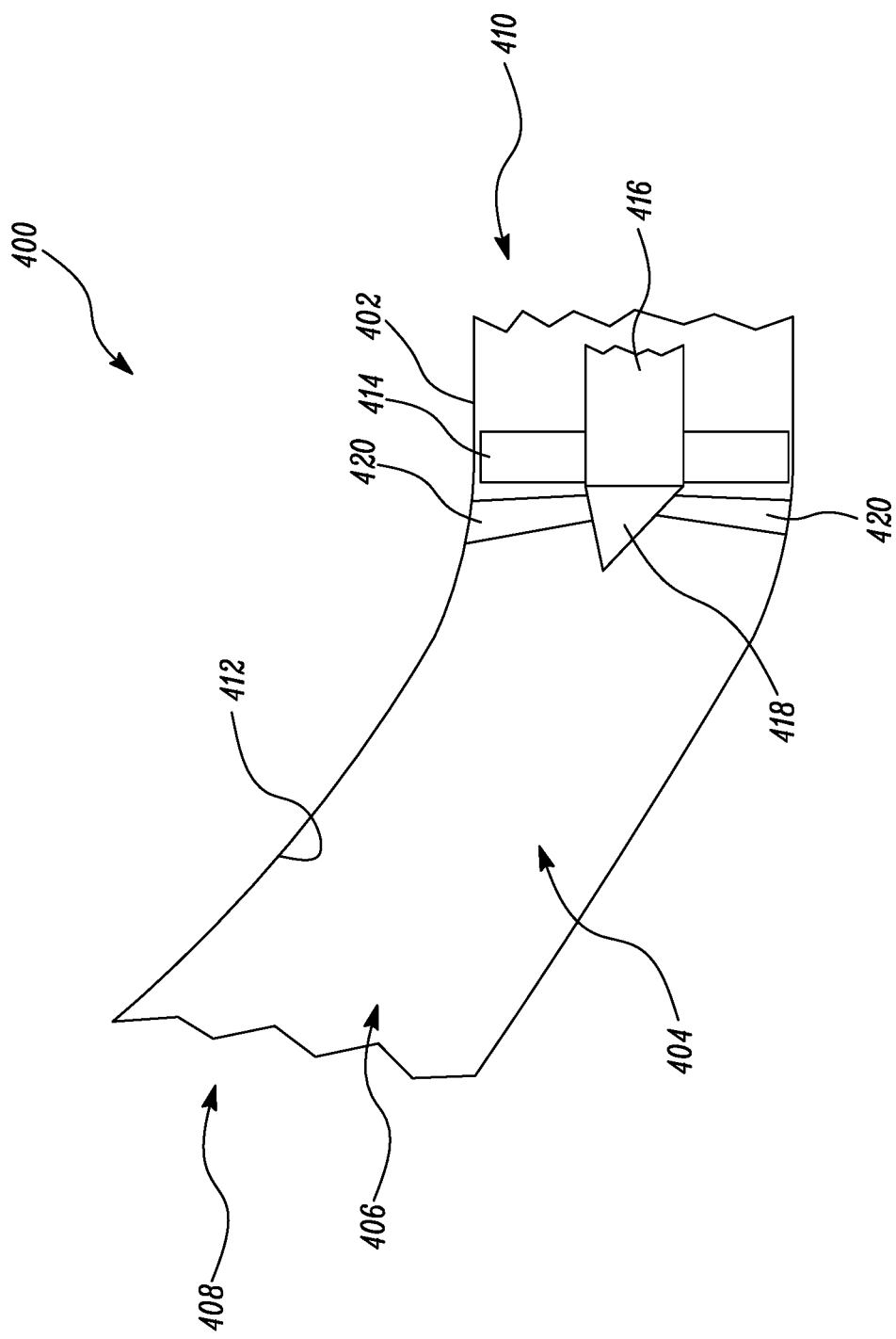
FIG. 4 is a schematic side view of a portion of a nacelle for an embedded gas turbine engine.

However, in case of embedded gas turbine engines, the gas turbine engine has an elongated intake duct for an air intake. Referring to FIG. 4, the embedded gas turbine engine includes a nacelle 400. The nacelle 400 is partially shown in FIG. 4 and may be part of the gas turbine engine 10 of FIG. 1. The nacelle 400 includes an annular wall 402. The annular wall 402 defines an intake duct 404. The intake duct 404 receives air from an air intake 406. The intake duct 404 includes an upstream end 408 and a downstream end 410 at an upstream and downstream locations, respectively. Further, the intake duct 404 has a surface 412 that defines its shape. In some embodiments, the intake duct 404 may include a circular or non-circular cross section. The intake duct 404 may have similar cross-section throughout the surface 412. However, in some examples, the intake duct 404 may have smaller cross section proximal to the upstream end 408. In some other examples, the intake duct 404 may have smaller cross section proximal to the downstream end 410. The nacelle 400 further includes a fan 414 and a shaft 416. The fan 414 is substantially similar to the fan 12 (shown in FIG. 1) of the gas turbine engine 10. The fan 414 is fixedly coupled to the shaft 416 and disposed downstream of an intake centre fairing 418. The intake centre fairing 418 is substantially similar to the intake centre fairing 506 of the gas turbine engine 10. The intake centre fairing 418 is also a non-rotating intake centre fairing with a non-axisymmetric geometry. The intake centre fairing 418 is fixedly coupled to one or more guide vanes 420. The guide vanes 420 are further fixedly coupled to the annular wall 402. The intake centre fairing 418 is stationary relative to the annular wall 402. The guide vanes 420 may direct an air flow to the fan 414. The fan 414 may supply air to the engine core 36 (shown in FIG. 1) that is received within the nacelle 400.

Figure 5B:
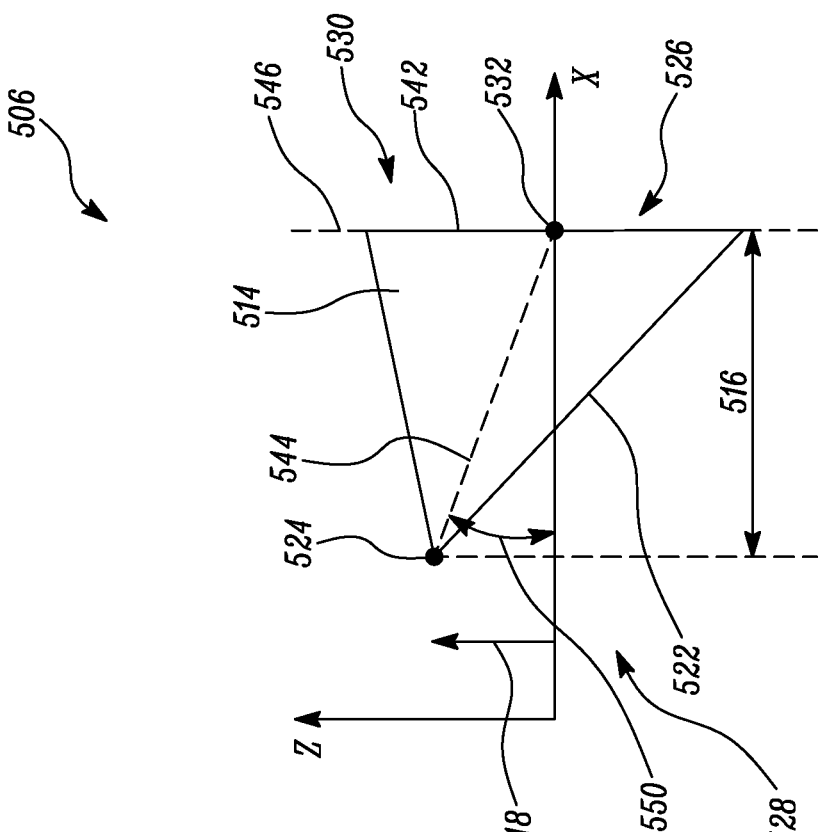
FIGS. 5A-5B are front and side views, respectively, of an intake centre fairing in accordance with an embodiment of the present disclosure.
Figure 5A:
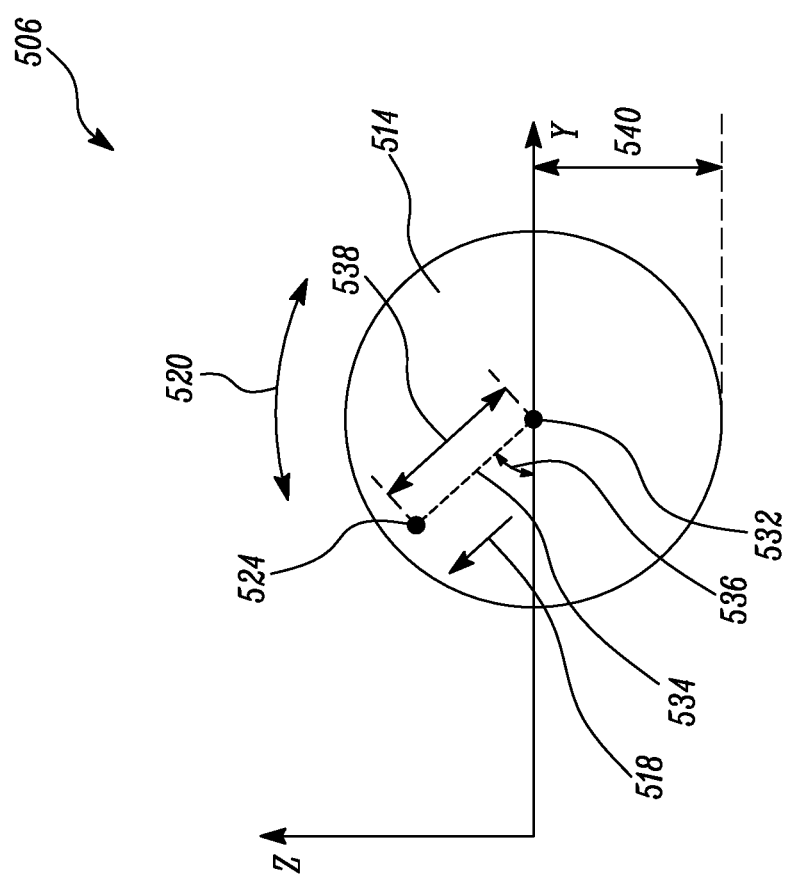

FIGS. 5A and 5B illustrate schematic side and front views, respectively, of the intake centre fairing 506.

Referring to FIGS. 1, 5A and 5B, the intake centre fairing 506 is a non-rotating intake centre fairing with a non-axisymmetric geometry. The intake centre fairing 506 may yield an air pressure to the engine core 36 more than a freestream pressure. The intake centre fairing 506 includes a body 514. The body 514 defines a longitudinal axis X along its length 516, a radial direction 518 relative to the longitudinal axis X and a circumferential direction 520 relative to the longitudinal axis X. In some embodiments, the body 514 further defines a transverse axis Z normal to the longitudinal axis X. The body 514 further defines a horizontal axis Y normal to the longitudinal axis X and the transverse axis Z.

The body 514 includes an outer surface 522, an apex point 524, and a base 526. The apex point 524 is at a first end 528 of the body 514. The base 526 is at a second end 530 of the body 514.

The outer surface 522 of the body 514 is tapered from the base 526 to the apex point 524 along the longitudinal axis X. In some embodiments, the outer surface 522 of the body 514 may be rounded around the apex point 524. In some other embodiments, the outer surface 522 of the body 514 may be rounded from the base 526 to the apex point 524. In some other embodiments, the outer surface 522 of the body 514 may be curved from the base 526 to the apex point 524 but conical at the first end 528 of the body 514.

The base 526 includes a base centre 532. In this embodiment, the base 526 has a circular shape and the base centre 532 is a centre of the circular shape. Optionally, the base 526 may have a non-circular shape. In some embodiments, the base 526 may define a base area normal to the longitudinal axis X and the base centre 532 may be a centroid of the base area. In some embodiments, the longitudinal axis X passes through the base centre 532.

The body 514 is at least partially oblique cone shaped. The oblique cone shape is a cone shape in which the apex point 524 is not co-axial with the base centre 532. Specifically, the apex point 524 is radially offset relative to the base centre 532 along the radial direction 518. The apex point 524 is further circumferentially offset relative to the base centre 532 along the circumferential direction 520. In some embodiments, the apex point 524 may be offset from the base centre 532 relative to the horizontal axis Y. In some embodiments, the apex point 524 may be offset from the base centre 532 relative to the transverse axis Z.

In some other embodiments, the body 514 may be rounded around the apex point 524. In some other embodiments, the body 514 may be curved from the base 526 to the apex point 524. In some other embodiments, the body 514 may be oblique cone shaped around the first end 528 and hemispherical around the second end 530.

Referring to FIG. 5A, the intake centre fairing 506 includes a radial line 534 joining the apex point 524 and the base centre 532 along the radial direction 518. The radial line 534 forms a spin angle 536 relative to the horizontal axis Y. The spin angle 536 is indicative of the circumferential offset of the apex point 524 relative to the base centre 532 as measured along the circumferential direction 520. In illustrated embodiment, the spin angle 536 is from 0 degree to 90 degrees. However, the spin angle 536 can be any angle from 90 degrees to 360 degrees. The intake centre fairing 506 further includes a radial offset 538 between the apex point 524 and the base centre 532. In illustrated embodiment, the radial offset 538 between the apex point 524 and the base centre 532 is less than a radius 540 of the base 526.

However, in some other embodiments, the radial offset 538 may be equal to or longer than the radius 540 of the base 526.

Referring to FIG. 5B, the body 514 includes a base line 542 and a bisection line 544. The base line 542 is a line 546 which coincides with the base 526 along the transverse axis Z. The base centre 532 is defined as a mid-point of the base line 542. The longitudinal axis X passes through the base line 542 and bisects the base line 542 at the base centre 532. The bisection line 544 is a line which passes through the apex point 524 and the base centre 532 of the intake centre fairing 506. The bisection line 544 is inclined at an angle 550 relative to the longitudinal axis X. The geometry of the bisection line 544 may control the geometry of the intake centre fairing 506, for example, a length of the bisection line 544 may control the length 516 of the intake centre fairing 506. Further, the angle 550 between the bisection line 544 and the longitudinal axis X may control the radial offset 538 between the apex point 524 and the base centre 532. The apex point 524 is further vertically upwards relative to the longitudinal axis X.

However, based on the angle 550, the apex point 524 may be vertically downwards relative to the longitudinal axis X.

While the intake centre fairing 506 has generally been described in the context of the gas turbine engines having small intake, it will be understood that they could equally be used in a ducted fan gas turbine engine or an embedded gas turbine engine.

Figure 6B:
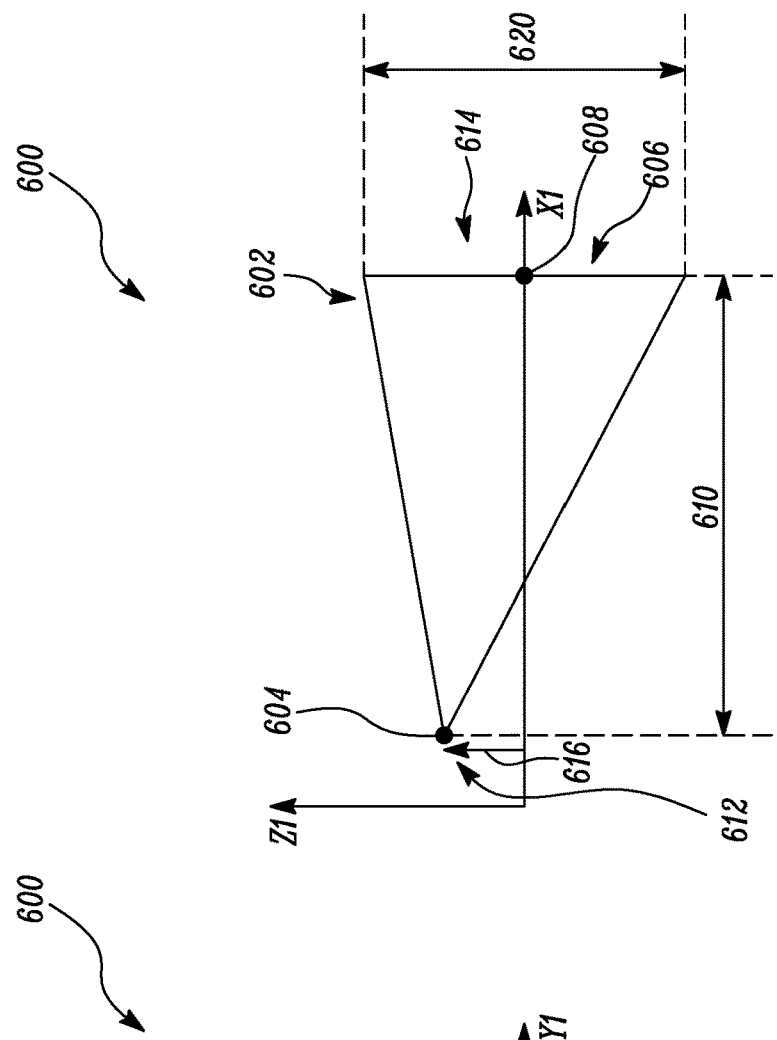
FIGS. 6A-6B are front and side views, respectively, of another intake centre fairing in accordance with an embodiment of the present disclosure.
Figure 6A:
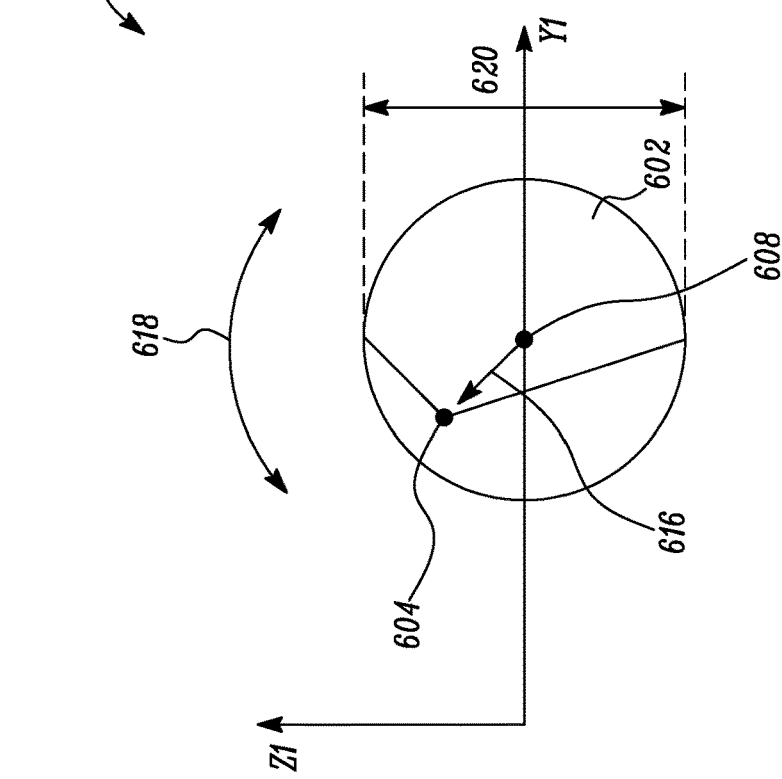

An intake centre fairing with a non-axisymmetric geometry can modify the local flow field which approaches the fan inner region and may provide control to the bulk area distributions and address flow non-uniformities FIGS. 6A-6B illustrate front and side views, respectively, of an intake centre fairing 600 in accordance with an embodiment of the present disclosure. The intake centre fairing 600 has equivalent design parameters as the intake centre fairing 506 of FIGS. 5A and 5B. However, the intake centre fairing 600 is more elongated as compared to the intake centre fairing 506. The intake centre fairing 600 includes a body 602. The body 602 includes an apex point 604 at a first end 612 of the body 602 and a base 606 at a second end 614 of the body 602. The base 606 has a circular shape and includes a base centre 608. The body 602 has a length 610. The body 602 defines a longitudinal axis X1 along the length 610, a radial direction 616 relative to the longitudinal axis X1, and a circumferential direction 618 relative to the longitudinal axis X1. The body 602 further defines a horizontal axis Y1 and a transverse axis Z1. The apex point 604 is both radially and circumferentially offset with respect to the base centre 608.

The length 610 of the body 602 is more than a diameter 620 of the base 606. The intake centre fairing 600 is at least partially oblique cone shaped. The oblique cone shape of the intake centre fairing 600 is a cone shape in which the apex point 604 is not co-axial with the base centre 608.

FIGS. 7A-7B illustrate front and side views, respectively, of an intake centre fairing 700 in accordance with an embodiment of the present disclosure. The intake centre fairing 700 has equivalent design parameters as the intake centre fairing 506 of FIGS. 5A and 5B. However, the intake centre fairing 700 is less elongated as compared to the intake centre fairing 506. The intake centre fairing 700 includes a body 702. The body 702 includes an apex point 704 at a first end 712 of the body 702 and a base 706 at a second end 714 of the body 702. The base 706 has a circular shape and includes a base centre 708. The body 702 has a length 710. The body 702 defines a longitudinal axis X2 along the length 710, a radial direction 716 relative to the longitudinal axis X2, and a circumferential direction 718 relative to the longitudinal axis X2. The body 702 further defines a horizontal axis Y2 and a transverse axis Z2. The apex point 704 is both radially and circumferentially offset with respect to the base centre 708.

The length 710 of the body 702 is less than a diameter 720 of the base 706. The intake centre fairing 700 is also at least partially oblique cone shaped which means the apex point 704 is not co-axial with the base centre 708.

FIGS. 8A-8B illustrate front and side views of an intake centre fairing 800 in accordance with an embodiment of the present disclosure. The intake centre fairing 800 has equivalent design parameters as the intake centre fairing 506 of FIGS. 5A and 5B. However, the intake centre fairing 800 has a round shape. The intake centre fairing 800 includes a body 802. The body 802 includes an apex point 804 at a first end 812 of the body 802 and a base 806 at a second end 814 of the body 802. The base 806 has a circular shape and includes a base centre 808. The body 802 has a length 810. The body 802 defines a longitudinal axis X3 along the length 810, a radial direction 816 relative to the longitudinal axis X3, and a circumferential direction 818 relative to the longitudinal axis X3. The body 802 further defines a horizontal axis Y3 and a transverse axis Z3.

The body 802 of the intake centre fairing 800 is rounded around the apex point 804. The body 802 is shaped like a curved cone 820 that tapers from the second end 814 to the first end 812. The curved cone 820 has a convex shape that curved inwardly from the second end 814 to the first end 812 relative to the longitudinal axis X3.

Figure 9B:
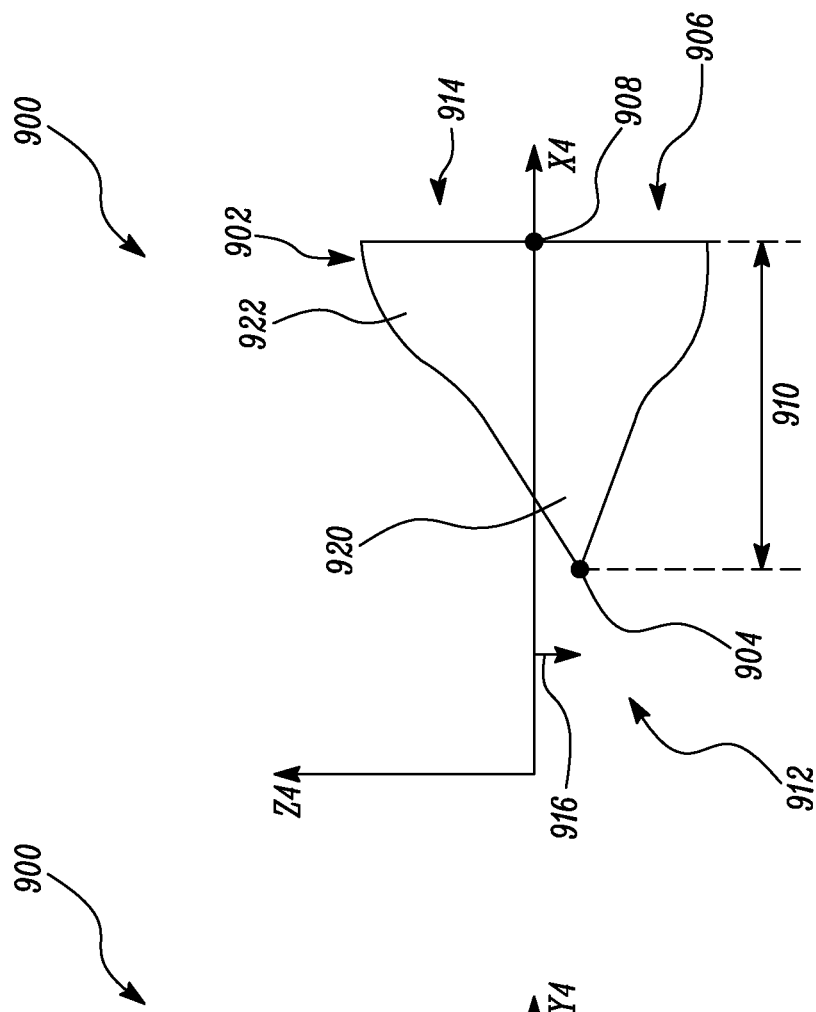
FIGS. 9A-9B are front and side views, respectively, of another intake centre fairing in accordance with an embodiment of the present disclosure.
Figure 9A:
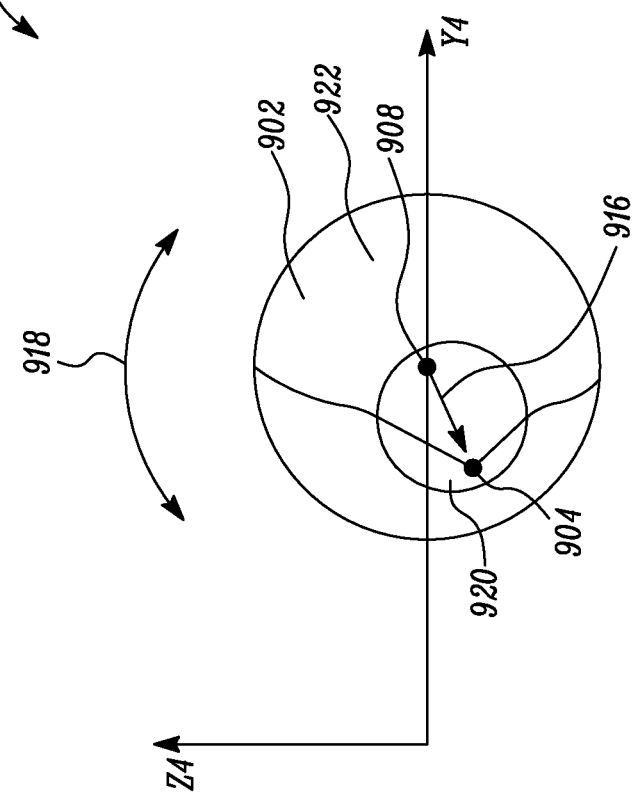

FIGS. 9A-9B illustrate front and side views of an intake centre fairing 900 in accordance with an embodiment of the present disclosure. The intake centre fairing 900 has equivalent design parameters as the intake centre fairing 506 of FIGS. 5A and 5B. However, the intake centre fairing 900 is at least partly curved. The intake centre fairing 900 includes a body 902. The body 902 includes an apex point 904 at a first end 912 of the body 902 and a base 906 at a second end 914 of the body 902. The base 906 has a circular shape and includes a base centre 908. The body 902 has a length 910. The body 902 defines a longitudinal axis X4 along the length 910, a radial direction 916 relative to the longitudinal axis X4, and a circumferential direction 918 relative to the longitudinal axis X4. The body 902 further defines a horizontal axis Y4 and a transverse axis Z4.

The body 902 of the intake centre fairing 900 has a conical part 920 attached on a spherical segment 922 such that the intake centre fairing 900 has a continuous profile for the smooth transition of intake airflow. The conical part 920 is at the first end 912 of the body 902 and the spherical segment 922 is at the second end 914 of the body 902. Both the conical part 920 and the spherical segment 922 are oblique relative to the longitudinal axis X4. The conical part 920 includes the apex point 904 of the body 902 at its vertex. The spherical segment 922 includes the base 906 of the body 902 at its base. The body 902 The apex point 904 is radially and circumferentially offset relative to the base centre 908 along the radial and circumferential directions 916, 918, respectively. Further, the apex point 904 is vertically downwards relative to the longitudinal axis X4.

The intake centre fairing of the present disclosure may provide an additional degree of freedom in the specification of the complete geometry ahead of the fan. The intake centre fairing may further provide control to the bulk area distributions of air flow and influence flow non-uniformities. The intake centre fairing can be used in a large geared Ultra-High Bypass Ratio (UHBPR) engine. In case of UHBPR engine, the heat generated in the gear box need to be vented. Further vented heat can be used to provide anti-icing to the intake centre fairing.

While the disclosure has been described in conjunction with the exemplary embodiments described above, many equivalent modifications and variations will be apparent to those skilled in the art when given this disclosure. For example, although described above in relation to a positively scarfed intake, the present disclosure can also be applied to a negatively scarfed intake. In such a situation, the apex point of the intake centre fairing can be offset vertically downward from the principal rotational axis of the gas turbine engine in order to counteract an airflow asymmetry which has higher Mach numbers at the top than at the bottom of the diffuser. Another option is for the intake to be toed, in which case the apex of the oblique circular cone can be offset to port or starboard of the engine centreline. Accordingly, the exemplary embodiments of the invention set forth above are considered to be illustrative and not limiting.

We claim:

1. A gas turbine engine for an aircraft, the gas turbine engine comprising:
    a nacelle comprising:
        an annular wall defining an intake duct;
        at least one guide vane fixedly coupled to the annular wall; and
        an intake centre fairing comprising a body comprising an outer surface, an apex point at a first end of the body and a base at a second end of the body, the body defining a longitudinal axis (X) along its length, a radial direction relative to the longitudinal axis (X) and a circumferential direction relative to the longitudinal axis (X), the outer surface of the body tapering from the base to the apex point along the longitudinal axis (X), the base comprising a base centre;
        wherein the apex point is radially offset relative to the base centre along the radial direction,
        wherein the apex point is further circumferentially offset relative to the base centre along the circumferential direction, and
        wherein the intake centre fairing is fixedly coupled to the at least one guide vane such that the intake centre fairing is stationary relative to the annular wall; and
    a fan received within the nacelle and disposed downstream of the intake centre fairing.

2. The gas turbine engine of claim 1, wherein the base has a circular shape and the base centre is a centre of the circular shape.

3. The gas turbine engine of claim 2, wherein a radial offset between the apex point and the base centre is less than a radius of the base.

4. The gas turbine engine of claim 1, wherein the base defines a base area normal to the longitudinal axis (X), and wherein the base centre is a centroid of the base area.

5. The gas turbine engine of claim 1, wherein the longitudinal axis (X) passes through the base centre.

6. The gas turbine engine of claim 1, wherein the body further defines a transverse axis (Z) normal to the longitudinal axis (X), wherein the apex point is offset from the base centre relative to the transverse axis (Z).

7. The gas turbine engine of claim 6, wherein the body further defines a horizontal axis (Y) normal to each of the longitudinal axis (X) and the transverse axis (Z), wherein the apex point is offset from the base centre relative to the horizontal axis (Y).

8. The gas turbine engine of claim 7, wherein a radial line joining the apex point and the base centre along the radial direction forms a spin angle relative to the horizontal axis (Y), and wherein the spin angle is from 0 degree to 90 degrees.

9. The gas turbine engine of claim 1, wherein the body is at least partially oblique cone shaped.

10. The gas turbine engine of claim 1, wherein the body is rounded around the apex point.

11. The gas turbine engine of claim 1, further comprising an engine core received within the nacelle.

* * * * *